United States Patent
Hume et al.

[19]

[11] Patent Number: 6,046,728
[45] Date of Patent: Apr. 4, 2000

[54] KEYBOARD ACTUATED POINTING DEVICE

[75] Inventors: Robert K. Hume; Steven D. Gluskoter, both of Austin, Tex.

[73] Assignee: Dell USA, L.P., Round Rock, Tex.

[21] Appl. No.: 08/986,080

[22] Filed: Dec. 5, 1997

[51] Int. Cl.[7] ................................................ G09G 5/08
[52] U.S. Cl. ..................................... 345/157; 345/168
[58] Field of Search ............................. 345/156, 157, 345/163, 161, 168, 184, 169, 173, 179; 273/148.13; 74/471 XY, 478; 200/6 A

[56] References Cited

U.S. PATENT DOCUMENTS

| | | | |
|---|---|---|---|
| 4,369,439 | 1/1983 | Broos | 345/163 |
| 5,086,296 | 2/1992 | Clark | 345/157 |
| 5,245,321 | 9/1993 | Franz et al. | 345/172 |
| 5,382,962 | 1/1995 | Young | 345/157 |
| 5,446,480 | 8/1995 | Yoshida | 345/157 |
| 5,499,041 | 3/1996 | Brandenburg et al. | 345/174 |
| 5,579,032 | 11/1996 | Busch | 345/157 |
| 5,613,786 | 3/1997 | Howell et al. | 400/489 |
| 5,675,361 | 10/1997 | Santilli | 345/168 |
| 5,790,108 | 8/1998 | Salcudean et al. | 345/184 |
| 5,808,603 | 9/1998 | Chen | 345/157 |
| 5,841,426 | 11/1998 | Dodson et al. | 345/163 |

*Primary Examiner*—Xiao Wu
*Attorney, Agent, or Firm*—Skjerven, Morrill, Macpherson, Franklin & Friel L.L.P.; Marc R. Ascolese

[57] ABSTRACT

An apparatus that includes a keyboard movable by a user while her hands are resting on the keyboard actuates a pointing device for a computer system. The movement of the keyboard maneuvers or steers the pointing device, and the user's hands need never be lifted from or leave the keyboard. The apparatus actuating a pointing device includes a first tray and a second tray. The first tray has a surface, and a portion of the pointing device is located on the surface. The second tray is positioned above the first tray whereby motion of the second tray actuates the pointing device.

39 Claims, 3 Drawing Sheets

KEYBOARD ACTUATED POINTING DEVICE

BACKGROUND OF THE INVENTION

1. Field of the Invention

This invention relates to pointing devices used as input devices for computers, and particularly pointing devices that are actuated or steered by the movement of a keyboard.

2. Description of the Related Art

Pointing devices that allow user input to programs operating on computers, for example for controlling cursor or pointer movement on the computer's display, are a common part of most computer systems. In particular, computer programs employing graphical user interfaces make extensive use of pointing devices to access program functions. A variety of different pointing devices are well known and include: pointing sticks, trackballs, touchpads, and mice.

Pointing sticks feature a small vertical beam projecting upward from the keyboard or some other portion of a computer system. Because they are relatively small devices, pointing sticks are often used in portable computer systems where space is at a premium. Pointing sticks may be deflected in any direction perpendicular to the vertical, the amount and direction of applied force determining the direction and the distance a pointer or cursor moves on the display of the computer system. Pointing sticks are accompanied by one or more pointing device pick buttons which are momentarily activated switches (i.e. switches having discrete on and off states depending on applied pressure) that a user may selectively depress, thereby sending commands to the computer system. However, many users find pointing sticks counterintuitive and difficult to use, in part because of their small size (typically comparable to that of a pencil eraser). Additionally, long-term use of pointing sticks leads some users to develop finger numbness or pain due to the excessive pushing forces applied to the vertical beam.

Trackballs typically include a base adapted to cradle a freely rotatable ball which, in turn, can be rotated by a user's palm or fingers. Rotation of the ball usually actuates a pair of rollers whose motion is translated into X-Y motion for purposes of pointer or cursor movement. Trackballs are accompanied by one or more pointing device pick buttons which are momentarily activated switches that a user may selectively depress, thereby sending commands to the computer system. Trackballs do suffer from several significant disadvantages. For example, the rollers usually used by trackballs accumulate debris, particularly because at least some portion of the trackball is exposed and because of constant contact with a users hand or fingers. Additionally, trackballs generally require a large volume to package, a particular disadvantage in portable computer systems where space and size are always at a premium.

Touchpads are characterized by a substantially immobile base having a touch-sensitive membrane sensor pad located on a top surface. When a user touches a portion of the sensor pad, the portion either mechanically compresses or registers a change in some electrical property (e.g. capacitance), thereby locating where the user has touched the touchpad. The location is translated into location information for cursor or pointer movement. Additionally, non-position related input can be made through a touchpad. For example, commands similar to those issued by activation of a pointing device pick button can be issued using a touch pad when a user touches the same location on the touch pad twice in succession. Like pointing sticks, many users find touchpads difficult to use and uncomfortable to use for prolonged periods. Additionally, touchpads consume large surface areas on computer systems, which is a feature particularly troublesome for portable computer systems.

A mouse is perhaps the most common pointing device used for computer systems, but it too suffers from significant disadvantages. A mouse requires a stable and sizable work surface for proper use and suffers from many of the same cleaning problems as trackballs because most mice use rollers similar to those in trackballs. A mouse is also disadvantageous when used with portable computer systems because it is not an integrated part of the system, and thus it must be disconnected form the portable computer system and carried separately when the portable computer system is transported.

Accordingly, it is desirable to have a pointing device that is: easily integrated into a computer system and particularly a portable computer system, intuitive to use, ergonomic in that it minimizes physical strain on the user, and relatively small, consuming minimal surface area and/or volume.

SUMMARY OF THE INVENTION

It has been discovered that the disadvantages of a variety of different pointing devices can be minimized or eliminated by an apparatus that includes a keyboard movable by a user while her hands are resting on the keyboard. The movement of the keyboard actuates a pointing device, and the user's hands need never be lifted from or leave the keyboard.

Accordingly, one aspect of the present invention provides an apparatus for actuating a pointing device. The apparatus includes a first tray having a surface. A portion of the pointing device is located on the surface. A second tray is positioned above the first tray so that motion of the second tray actuates the pointing device.

In another aspect of the invention, a pointing device includes a plurality of sensors, a first tray, and a second tray. Each of the plurality of sensors is capable of detecting motion in at least one direction. The first tray has a surface, and at least one of the plurality of sensors is located on the surface. The second tray is positioned above the first tray whereby motion of the second tray actuates at least one of the sensors.

In still another aspect of the invention, a computer system includes a chassis, a processor, a memory electrically coupled to the processor, a pointing device electrically coupled to the processor, and an apparatus for actuating the pointing device. The apparatus includes a first tray having a surface. A portion of the pointing device is located on the surface. A second tray is positioned above the first tray so that motion of the second tray actuates the pointing device.

In another aspect of the invention, a pointing device actuator includes a base plate and a contact coupled to the base plate. The base plate is capable of receiving a keyboard. The contact is adapted to actuate a pointing device during movement of the base plate.

In another aspect of the invention, a method of providing a pointing device actuator is disclosed. A movable base plate is located in proximity to a pointing device. The base plate includes a contact and is capable of receiving a keyboard. The contact is aligned with the pointing device so that motion of the base plate causes the contact to actuate the pointing device.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
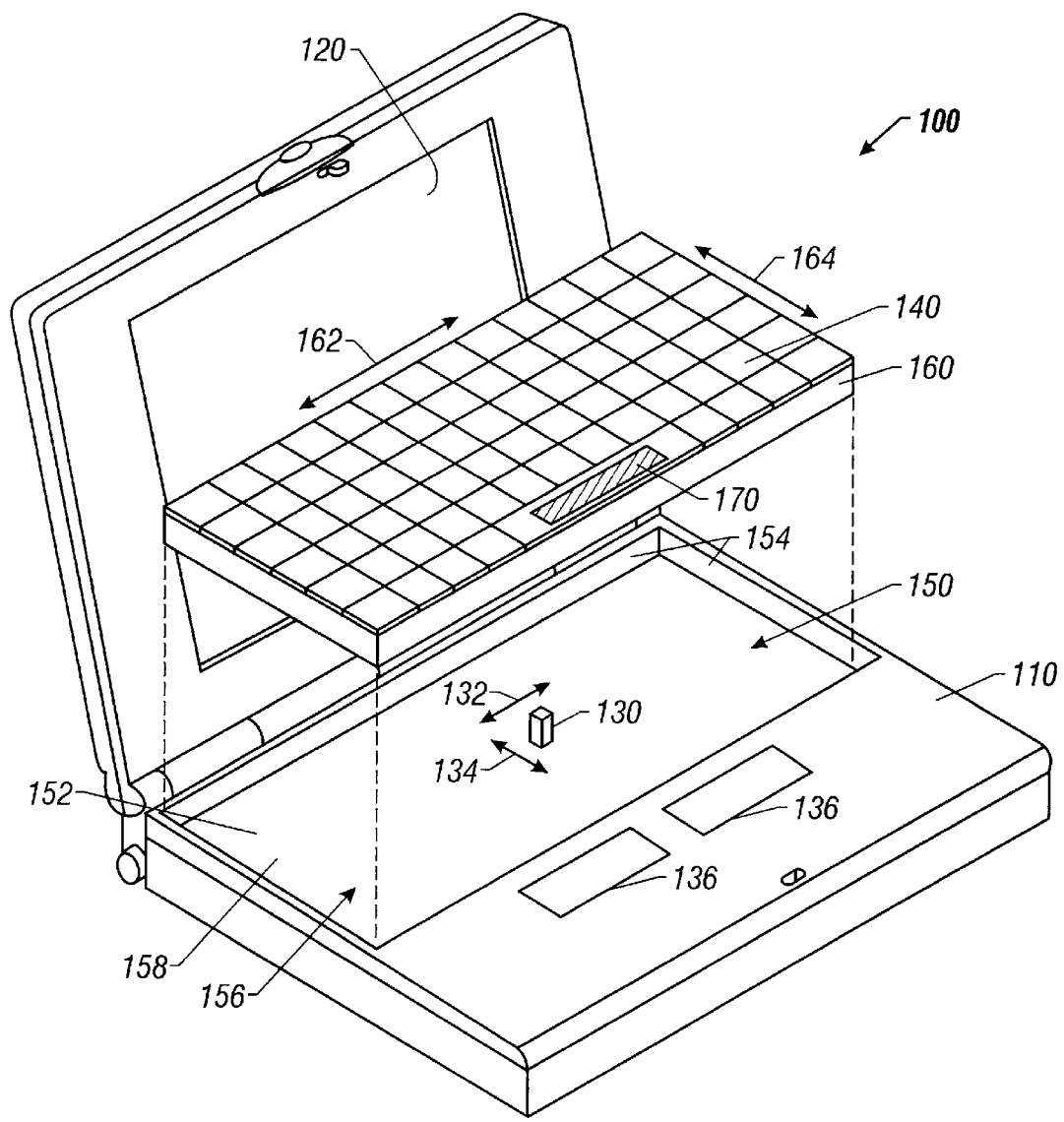
FIG. 1 illustrates a computer system that includes a keyboard actuated pointing stick pointing device.

Referring to FIG. 1, a computer system 100 is illustrated. Computer system 100 includes a chassis 110 and a display screen 120, upon which information is displayed including a pointer or cursor that is used to access program functions and whose movement on display screen 120 depends upon actuation of a pointing device. Pointing stick 130 is a pointing device for use with computer system 100. Deflection of pointing stick 130 in the directions indicated by arrows 132 and 134 (or some combination of the directions) produces corresponding input signals that are received by a processor (not shown). The processor uses the input signals from pointing stick 130 to locate and display a cursor or pointer on display screen 120. Computer system 100 also includes keyboard 140 for conventional data input into the computer system. Although computer system 100 is illustrated as a portable computer system, the features described in this application may be implemented in a variety of computer systems (e.g. portable, desktop, and tower) and indeed any device that makes use of a pointing device.

Coupled to the chassis 110 of computer system 100 is a first tray 150. First tray 150 may be a single base plate, or it may include a bottom tray portion and a plurality of side tray portions as illustrated in FIG. 1. Bottom tray portion 152 and side tray portions 154 each possess surfaces, and together they define a tray interior 156. Pointing devices, or portions thereof may be located on any of the surfaces of bottom tray portion 152 and side tray portions 154. For example, pointing stick 130 is located on surface 158 (the top surface of the bottom tray portion 152) of first tray 150. Second tray 160 may also be a single base plate, or it may include a bottom tray portion and a plurality of side tray portions. Second tray 160 is sized to fit in first tray interior 156. Depending on the type of pointing device used in computer system 100, second tray 160 may be only slightly smaller than first tray interior 156, thereby allowing second tray 160 to move only a small amount, or second tray 160 may be much smaller than first tray interior 156, thereby allowing greater movement of tray 160. Keyboard 140 is shown coupled to second tray 160, however keyboard 140 and tray 160 may be a single piece unit, or the two may be easily separable. Also coupled to the chassis are pointing device pick buttons 136. Pick buttons 136 are momentarily activated switches that a user may selectively depress, often in conjunction with actuation of the pointing device (e.g. "dragging" and icon), thereby sending commands to the computer system.

When located above tray 150, or inserted in tray 150, second tray 160 is capable of moving in the directions indicated by arrows 162 and/or arrows 164 thereby actuating pointing stick 130. To facilitate translation of second tray 160's movement into actuation of the pointing device, second tray 160 is coupled to pointing stick 130 by, for example, a slot or recess (not shown) located on the underside of second tray 160 and sized to receive pointing stick 130.

When operating computer system 100, a user typically has one or both hands on the keyboard, for example on the home row of keys, to facilitate efficient typing. By moving or steering the keyboard with one or both hands, the user can actuate pointing stick 130, thereby accomplishing desired pointing information input. Using one or both hands to actuate the pointing stick is preferable to conventional use of a single finger because it provides more control, is more intuitive, and distributes the required actuating force across several fingers instead of a single finger. Furthermore, keyboard 140 need not be specially modified to allow a pointing stick to protrude through or between keys of the keyboard. Pick buttons 136 are placed in a conventional location so that they may be actuated by a user's thumbs or other fingers.

During operation of the computer system 100, the processor interprets signals from the pointing device in order to determine the location to display a cursor or pointer on the display screen. Because normal computer system operation usually does not require simultaneous keyboard and pointing device input, the computer system should be able to distinguish keyboard movement associated with typing from keyboard movement intended to actuate the pointing device. One way to accomplish this is to include a mode selecting means that either allows the user to select from a pointing device mode (where pointing device input is intended) and a keyboard mode (where keyboard input is intended) or determines the current mode of operation (e.g. by software intelligence) based on operating conditions.

Mode selecting button 170 allows the user to select from a pointing device mode of operation and a keyboard mode of operation. Mode select button 170 may be a conventional switching button, or it may be some other sensor. For example, mode select button 170 may be a capacitive sensor or a charge transfer sensor that detects the presence of a user's thumb or finger. During normal typing (keyboard mode), the user's thumb or thumbs normally rest on the space bar and thus on mode select button 170. When the user wants to use the pointing device, he can switch into pointing device mode by removing his thumb or thumbs from the space bar. The computer system monitors the sensor, and depending on the input to the sensor, allows for operation in either keyboard or pointing device mode. Additionally, mode select button 170 may be located on any other key of the keyboard, may be a special key on the keyboard (similar to a caps lock key), or may be located elsewhere on computer system 100.

Alternatively, mode selection may be accomplished through software alone. For example, a program executing on the processor can monitor the keyboard for keystroke input and ignore any pointer device input that occurs simultaneously with, or in temporal proximity to the keystroke input. The program can also process pointing device input signals when there is no associated keystroke activity.

Figure 2:
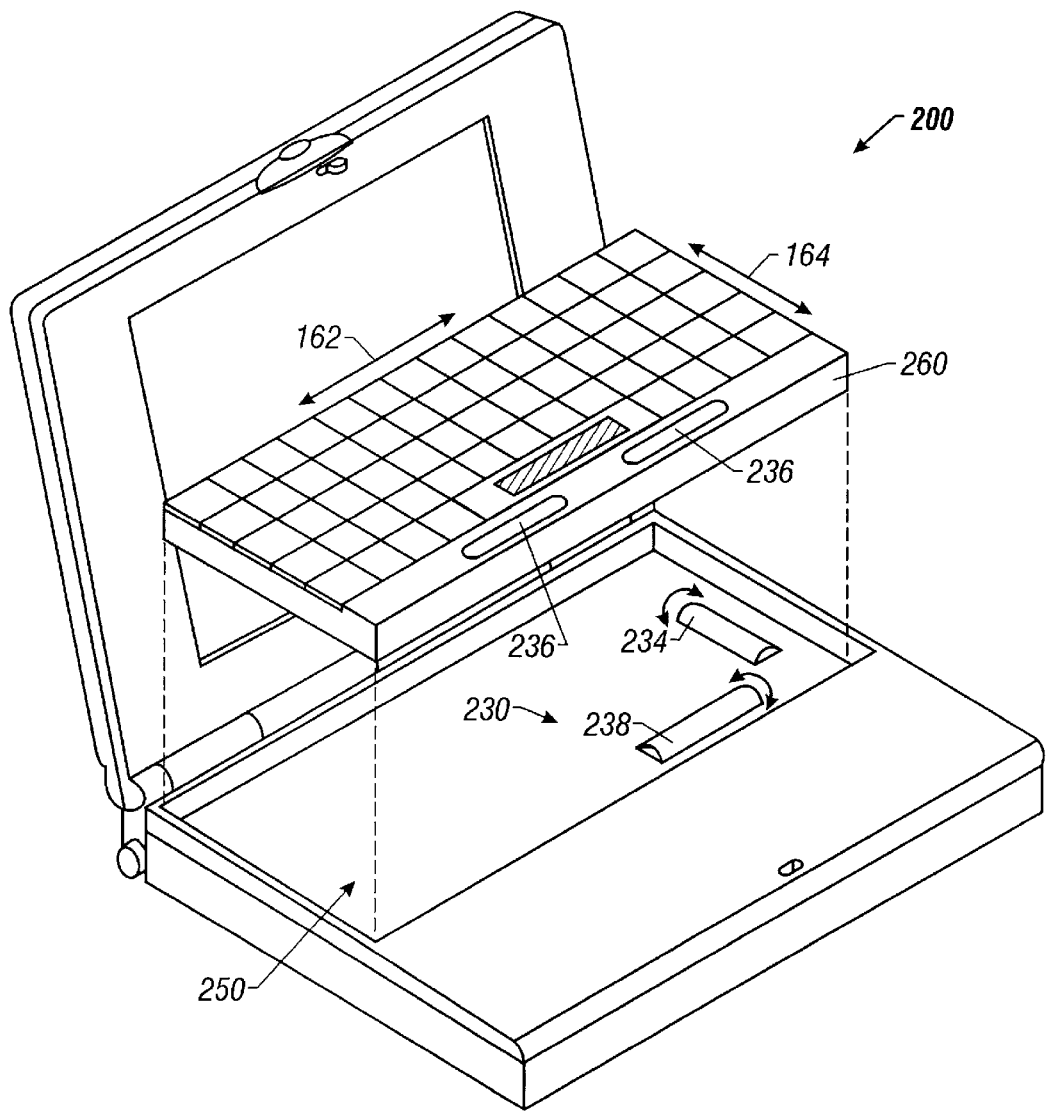
FIG. 2 illustrates a computer system that includes keyboard actuated rollers that are part of a pointing device.

FIG. 2 illustrates another example of a computer system 200 that includes a keyboard actuated point device. Pointing device 230 includes rollers 234 and 238 that when actuated provide X and Y coordinate input information, respectively. When located in tray 250, second tray 260 is capable of moving in the directions indicated by arrows 162 and/or arrows 164 thereby actuating rollers 234 and 238 of pointing device 230. Second tray 260 includes pointing device pick buttons 236. In this example, pointing device pick buttons are located on tray 260 so that despite travel of tray 260 during use, the pointing device pick buttons are conveniently located, and indeed move with the tray. Second tray 260 may also include one or more contacts to facilitate actuation of the pointing device. For example, a high friction contact located on the underside of tray 260 and aligned with rollers 234 and 238 enhances the ability of tray movement to actuate the pointing device.

Figure 3:
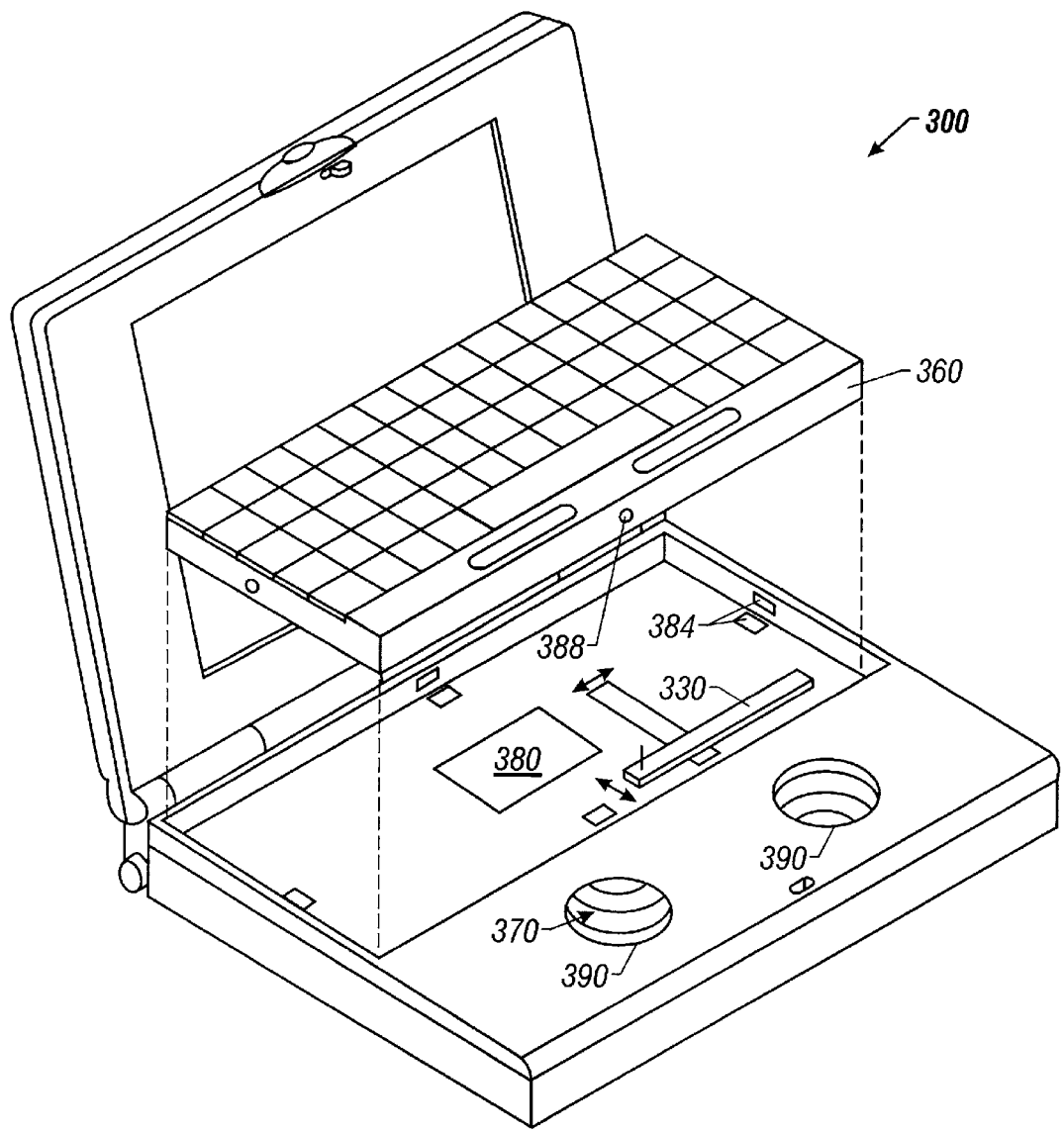
FIG. 3 illustrates a computer system that includes a variety of different keyboard actuated pointing devices included in the same figure for convenience.

FIG. 3 illustrates a variety of other examples of keyboard actuated pointing devices. The various devices have been included in the same figure for convenience, and typically would not all be included in a single computer system. Pointing device 330 includes two slides that have substantially linear reciprocating movement in the directions indicated by the arrows associated with the device. When the slides are coupled to tray 360 by, for example, a recess in the tray that receives a projection from the slides, movement of the tray actuates the slides, thereby providing coordinate input information to the computer system. Pointing device 380 is a touchpad that is actuated by the motion of a raised portion or stylus (not shown) on the underside of tray 360. Movement of tray 360 actuates touchpad 380 by dragging the raised portion, projection or stylus across the surface of the touchpad, much like a user would drag her finger across the touchpad. Other possible pointing devices are indicated by sensors 384 and 388. These sensors, for example force sensitive resistors or strain gauges, may be actuated by movement of tray 360. As FIG. 3 illustrates, such sensors may be located in a variety of different places in the computer system 300, but they should be located so as to detect movement of the tray in at least two perpendicular directions (e.g. in an X and a Y direction). Those of ordinary skill in the art will recognize that a variety of different pointing devices can be used in conjunction with the applicant's actuating apparatus, and that, consequently, the actuating apparatus may have a variety of different features or contacts facilitating pointing device actuation.

Pivot points 390 are raised and/or lowered portions of the chassis or case of computer system 300 used to help a user move the keyboard and tray. For example, during operation the user can keep one or both thumbs on the pivot points, thereby enhancing maneuverability of the keyboard and tray by providing the user with something to push or pull against. Additionally, the pivot points 390 may include a mode select button 370 that allows the user to switch between a keyboard mode and a pointing device mode much like mode select button 170 of FIG. 1.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An apparatus for actuating a pointing device comprising:
    a first tray having a surface, a portion of the pointing device being fixed on the surface; and
    a second tray positioned above the first tray whereby motion of the second tray with respect to the first tray actuates the pointing device.

2. The apparatus of claim 1 wherein:
    the first tray includes a bottom tray portion and a plurality of side tray portions, the bottom tray portion and the plurality of side tray portions defining a tray interior, the surface being located on one of the tray portions; and wherein
    the second tray is sized to fit in the first tray interior.

3. The apparatus of claim 1 further comprising a keyboard coupled to the second tray.

4. The apparatus of claim 3 wherein the keyboard includes:
    a pointing device pick button; and
    a means for selecting from a pointing device mode of operation and a keyboard mode of operation.

5. The apparatus of claim 1 wherein the second tray includes:
    a pointing device pick button; and
    a means for selecting from a pointing device mode of operation and a keyboard mode of operation.

6. The apparatus of claim 1 wherein the second tray is coupled to the pointing device.

7. The apparatus of claim 6 wherein the pointing device is a pointing stick.

8. The apparatus of claim 1 wherein the pointing device includes a plurality of sensors.

9. The apparatus of claim 8 wherein each of the plurality of sensors is a force sensitive resistor.

10. The apparatus of claim 1 wherein the pointing device includes a plurality of rollers.

11. The apparatus of claim 1 wherein the pointing device includes:
    a slide, the slide allowing substantially linear reciprocating movement; and
    a sensor coupled to the slide, the sensor capable of detecting the substantially linear reciprocating movement of the slide.

12. The apparatus of claim 1 wherein the pointing device is a touchpad and the second tray includes a raised portion for actuating the touchpad.

13. A pointing device comprising:
    a plurality of sensors, each sensor capable of detecting motion in at least one direction;
    a first tray having a surface, at least one of the plurality of sensors being fixed on the surface; and
    a second tray positioned above the first tray whereby motion of the second tray with respect to the first tray actuates the at least one of the sensors.

14. The pointing device of claim 13 further comprising a keyboard coupled to the second tray.

15. The pointing device of claim 14 wherein the keyboard includes:
    a pointing device pick button; and
    a means for selecting from a pointing device mode of operation and a keyboard mode of operation.

16. The pointing device of claim 13 wherein the second tray includes:
    a pointing device pick button; and
    a means for selecting from a pointing device mode of operation and a keyboard mode of operation.

17. The pointing device of claim 13 wherein the plurality of sensors is a plurality of force sensors.

18. The pointing device of claim 16 wherein each of the plurality of force sensors is a force sensitive resistor.

19. The pointing device of claim 13 wherein the each of plurality of the plurality of sensors is a roller.

20. The pointing device of claim 13 further comprising a plurality of slides, each slide allowing substantially linear reciprocating movement, each of the plurality of sensors being coupled to a respective slide, each sensor being capable of detecting the substantially linear reciprocating movement of its respective slide.

21. A computer system comprising:
    a chassis;
    a processor;
    a memory electrically coupled to the processor;

a pointing device electrically coupled to the processor; and an apparatus for actuating the pointing device including:
a first tray having a surface, a portion of the pointing device being fixed on the surface; and
a second tray positioned above the first tray whereby motion of the second tray with respect to the first tray actuates the pointing device.

22. The computer system of claim 21 further comprising a pointing device pick button located on the chassis.

23. The computer system of claim 21 further comprising a pivot point located on the chassis, the pivot point on which a user can place a thumb to facilitate movement of the second tray.

24. The computer system of claim 21 further comprising a keyboard coupled to the second tray.

25. The computer system of claim 24 wherein the keyboard includes:

a pointing device pick button; and a means for selecting from a pointing device mode of operation and a keyboard mode of operation.

26. The computer system of claim 21 wherein the second tray includes:

a pointing device pick button; and a means for selecting from a pointing device mode of operation and a keyboard mode of operation.

27. The computer system of claim 21 wherein the second tray is coupled to the pointing device.

28. The computer system of claim 27 wherein the pointing device is a pointing stick.

29. The computer system of claim 21 wherein the pointing device includes a plurality of sensors.

30. The computer system of claim 29 wherein each of the plurality of sensors is a force sensitive resistor.

31. The computer system of claim 21 wherein the pointing device includes a plurality of rollers.

32. The computer system of claim 21 wherein the pointing device includes:

a slide, the slide allowing substantially linear reciprocating movement; and a sensor coupled to the slide, the sensor capable of detecting the substantially linear reciprocating movement of the slide.

33. The computer system of claim 21 wherein the pointing device is a touchpad and the second tray includes a raised portion for actuating the touchpad.

34. The computer system of claim 21 wherein the processor executes a program implementing a means for selecting from a pointing device mode of operation and a keyboard mode of operation.

35. A pointing device actuator coupled into a computer system having a chassis, a processor, a memory electrically coupled to the processor, and a pointing device electrically coupled to the processor, comprising:

a base plate capable of receiving a keyboard and having with respect to the chassis; and a contact coupled to the base plate, the contact adapted to actuate a pointing device being fixed on the chassis during movement of the base plate.

36. The pointing device actuator of claim 35 wherein the contact is a recess in the base plate, the recess being sized to receive a portion of the pointing device.

37. The pointing device actuator of claim 35 wherein the contact is a projection from the base plate.

38. The pointing device actuator of claim 35 wherein the contact is a portion of the pointing device.

39. The pointing device actuator of claim 38 wherein the portion of the pointing device is a force sensor.

* * * * *

UNITED STATES PATENT AND TRADEMARK OFFICE
CERTIFICATE OF CORRECTION

PATENT NO.     : 6,046,728
ISSUE DATE     : April 4, 2000
INVENTOR(S)    : Gluskoter, Steven D.; Hume, Robert K.

It is certified that error appears in the above-identified patent and that said Letters Patent is hereby corrected as shown below:

Col. 8, line 21, after "and" please delete "having" and add --moving--.

Signed and Sealed this

Eighth Day of May, 2001

*Attest:*

NICHOLAS P. GODICI

*Attesting Officer*   Acting Director of the United States Patent and Trademark Office